United States Patent
Wang et al.

(10) Patent No.: US 10,191,618 B2
(45) Date of Patent: Jan. 29, 2019

(54) HAND-HELD ELECTRONIC APPARATUS HAVING FUNCTION OF ACTIVATING APPLICATION PROGRAM OF ELECTRONIC APPARATUS, AND METHOD THEREOF

(71) Applicant: Insyde Software Corporation, Taipei (TW)

(72) Inventors: Chih-Kao Wang, Taipei (TW); Kun Wan Wang, Taipei (TW)

(73) Assignee: INSYDE SOFTWARE CORPORATION, Taipei (TW)

( * ) Notice: Subject to any disclaimer, the term of this patent is extended or adjusted under 35 U.S.C. 154(b) by 200 days.

(21) Appl. No.: 14/810,957

(22) Filed: Jul. 28, 2015

(65) Prior Publication Data

US 2016/0034116 A1 Feb. 4, 2016

(30) Foreign Application Priority Data

Jul. 29, 2014 (TW) .............................. 103125821 A (51) Int. Cl.
*H04N 5/44* (2011.01)
*G06F 3/0488* (2013.01)
(Continued)

(52) U.S. Cl.
CPC .......... *G06F 3/0482* (2013.01); *G06F 3/0488* (2013.01); *G06F 17/30132* (2013.01);
(Continued)

(58) Field of Classification Search
CPC .. G06F 3/04817; G06F 3/0488; G06F 3/0482; G06F 17/30132; H04N 21/4126; H04N 5/4403; H04N 2005/443
See application file for complete search history.

(56) References Cited

U.S. PATENT DOCUMENTS 8,065,629 B1 * 11/2011 Ragan .................... G06F 3/0481
715/760
9,426,257 B1 * 8/2016 Pashkov ................. H04L 67/42
(Continued)

FOREIGN PATENT DOCUMENTS

| TW | 200809580 | 2/2008 |
|---|---|---|
| TW | 201123817 | 7/2011 |
| TW | 201245991 | 11/2012 |

*Primary Examiner* — Nicholas Klicos
(74) *Attorney, Agent, or Firm* — Muncy, Geissler, Olds & Lowe, P.C.

(57) ABSTRACT

A hand-held electronic apparatus having a function of activating an application program of an electronic apparatus is provided, including: a storage apparatus, configured to store an operating system and a thumbnail cache file received from the electronic apparatus, where the thumbnail cache file includes a thumb corresponding to an application program in the electronic apparatus; a touch screen, configured to display the thumbnail; and a processor, configured to display the thumbnail on the touch screen by using a thumbnail layout manner specified by the operating system. The present invention further provides a method for activating an application program of an electronic apparatus, and a computer program product, where an application program installed in an electronic apparatus is activated by a hand-held electronic apparatus, so as to avoid difficulty in an operation of simulated mouse movement or keyboard input by using a hand-held electronic apparatus.

11 Claims, 5 Drawing Sheets

(51) Int. Cl.
  *G06F 17/30* (2006.01)
  *G06F 3/0482* (2013.01)
  *H04N 21/41* (2011.01)
(52) U.S. Cl.
  CPC ....... *H04N 5/4403* (2013.01); *H04N 21/4126* (2013.01); *H04N 2005/443* (2013.01)

(56) References Cited

U.S. PATENT DOCUMENTS

| | | | | |
|---|---|---|---|---|
| 2006/0206861 A1* | 9/2006 | Shenfield | ................. | G06F 8/35 717/106 |
| 2006/0242163 A1* | 10/2006 | Miller | ................. | G06F 12/0875 |
| 2008/0320419 A1* | 12/2008 | Matas | ................. | G01C 21/20 715/863 |
| 2009/0070404 A1* | 3/2009 | Mazzaferri | ............. | G06F 9/542 709/202 |
| 2009/0144652 A1* | 6/2009 | Wiley | ................... | G06F 9/451 715/800 |
| 2011/0167364 A1* | 7/2011 | Pentikainen | .......... | G06F 9/4443 715/764 |
| 2011/0213855 A1* | 9/2011 | King | ................... | G06F 3/0481 709/217 |
| 2012/0017162 A1* | 1/2012 | Khokhlov | ............ | G06F 9/4443 715/765 |
| 2012/0179999 A1* | 7/2012 | Nesladek | .............. | G06F 3/0488 715/835 |
| 2012/0260202 A1* | 10/2012 | Jiang | ....................... | G06F 9/445 715/765 |
| 2012/0317488 A1* | 12/2012 | Rudolph | ................. | G06F 9/542 715/733 |
| 2013/0031462 A1* | 1/2013 | Calvo | ..................... | G06F 9/545 715/234 |
| 2013/0174047 A1* | 7/2013 | Sivakumar | ........... | G06F 9/4443 715/746 |
| 2013/0246970 A1* | 9/2013 | Helle | ..................... | G06F 3/0482 715/822 |
| 2013/0290858 A1* | 10/2013 | Beveridge | ............. | G06F 3/0484 715/740 |
| 2014/0053198 A1* | 2/2014 | Sirpal | .............. | H04N 21/8173 725/43 |
| 2014/0115506 A1* | 4/2014 | George | ............. | G06F 11/3438 715/764 |
| 2014/0250390 A1* | 9/2014 | Holmes | ................. | G06F 9/4443 715/760 |
| 2014/0380218 A1* | 12/2014 | Johnnie | ................. | A61B 5/157 715/771 |
| 2015/0215245 A1* | 7/2015 | Carlson | ................... | H04L 51/16 715/752 |
| 2016/0335098 A1* | 11/2016 | Berube | ............... | G06F 3/04817 |
| 2017/0123982 A1* | 5/2017 | Haven | ................ | G06F 12/0813 |

* cited by examiner

HAND-HELD ELECTRONIC APPARATUS HAVING FUNCTION OF ACTIVATING APPLICATION PROGRAM OF ELECTRONIC APPARATUS, AND METHOD THEREOF

BACKGROUND

Technical Field

The present invention relates to the technical field of a type of hand-held electronic apparatus, and in particular, to a hand-held electronic apparatus having a function of activating an application program of an electronic apparatus, a method thereof and a computer program product.

Related Art

At present, more people gradually utilize a smart phone and connect the smart phone to a smart television, to enable the smart television to have a function of multimedia entertainment. Such a demand also leads to combined use of a wireless keyboard and mouse, and control of a computer by using a smart phone in a wireless manner. A smart phone is used to conveniently send an instruction for executing mouse movement, keyboard input, multimedia control, and the like, so as to control a computer. For example, according to the prior art, an application program Unified Remote is downloaded into a smart phone and a computer, and executed at the same time, so that the smart phone turns to a universal remote control of the computer. The existing application program Unified Remote has supported a remote operation between a smart phone including an Android phone, iPhone, and a Windows Phone, and a computer installed with an operating system including Windows, Mac and Linux.

However, in the above operating modes, as a smart phone and a computer have different screen sizes, when an application program installed in a computer is activated by performing simulated mouse movement or keyboard input on a smart phone, remarkable difficulty exists in control thereof. In addition, a user needs to watch two screens at the same time, thereby leading to operational inconvenience.

SUMMARY

In view of the above problem, an objective of the present invention is to provide a hand-held electronic apparatus having a function of activating an application program of an electronic apparatus, a method thereof, and a computer program product, where an application program installed in a smart television, desktop computer, or notebook computer is activated by using a hand-held electronic apparatus, so as to avoid difficulty in an operation of simulated mouse movement or keyboard input by using a hand-held electronic apparatus.

A first embodiment of the present invention provides a hand-held electronic apparatus having a function of activating an application program of an electronic apparatus, including:

a storage apparatus, configured to store an operating system and a thumbnail cache file received from the electronic apparatus, the thumbnail cash file including a thumbnail that corresponds to an application program in the electronic apparatus;

a touch screen, configured to display the thumbnail; and a processor, configured to display the thumbnail on the touch screen by using a thumbnail layout manner specified by the operating system.

A second embodiment of the present invention provides a method for activating an application program of an electronic apparatus, the method including the following steps:

receiving a thumbnail cache file by using a hand-held electronic apparatus, the thumbnail cache file including a thumbnail that corresponds to an application program in the electronic apparatus; and displaying the thumbnail on a touch screen by using a thumbnail layout manner specified by an operating system of the hand-held electronic apparatus.

A third embodiment of the present invention provides a computer program product having a program stored therein, when the program is loaded and executed by a hand-held electronic apparatus, performing the method according to the second embodiment of the present invention.

DETAILED DESCRIPTION

To make a person of ordinary skill in the art further understand the present invention, the following describes in detail the content and purposes of the present invention by reference to preferred embodiments of the present invention and in combination with accompanying drawings.

Figure 1:
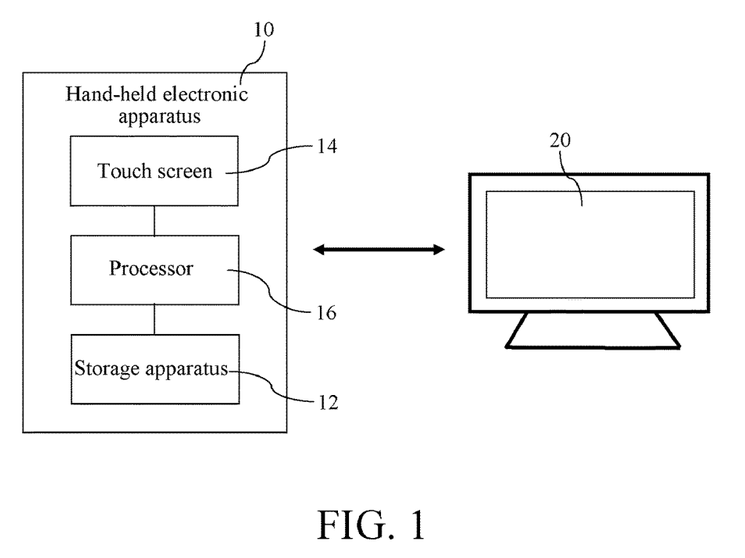
FIG. 1 is a block diagram of a hand-held electronic apparatus having a function of activating an application program of an electronic apparatus according to the present invention.

FIG. 1 is a block diagram of a hand-held electronic apparatus having a function of activating an application program of an electronic apparatus according to the present invention. In FIG. 1, a hand-held electronic apparatus 10 includes a storage apparatus 12, a touch screen 14 and a processor 16. The hand-held electronic apparatus 10 is a smart phone or a tablet computer. An electronic apparatus 20 is a computer, a notebook computer, or a smart television.

Figure 2:
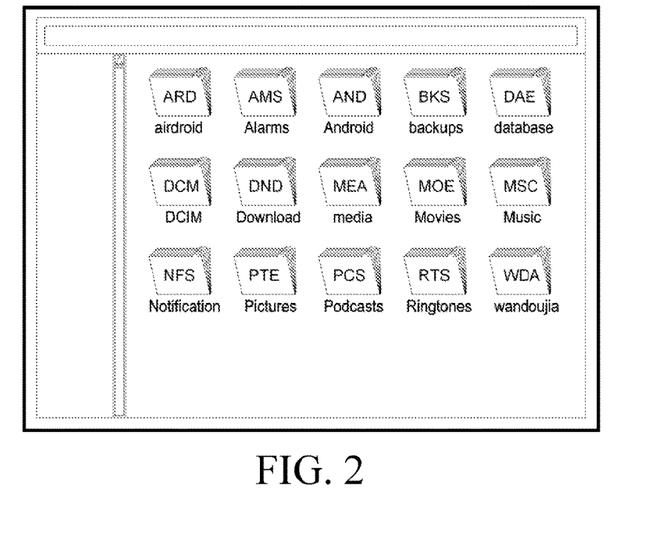
FIG. 2 is a schematic diagram of a thumbnail displayed by an electronic apparatus according to the present invention.

For example, a storage apparatus 12 of a memory stores an operating system and a thumbnail cache file received from the electronic apparatus 20, where the thumbnail cache file includes a thumbnail corresponding to an application program in the electronic apparatus 20. As shown in FIG. 2, provided is a schematic diagram of a thumbnail displayed by an electronic apparatus according to the present invention. Windows thumbnail caching is a function that has been added into a Microsoft Windows operating system from Windows 2000. Windows thumbnail caching draws a thumbnail of a specific type of file in each folder in advance, and stores the thumbnail into a thumbs.db file in the folder. Storing a thumbnail in such a manner can save the time needed for redrawing the thumbnail by the system each time a user opens a folder by using a Windows file manager.

A program generating a file thumbnail needs to consume abundant CPU resources, and therefore, if a folder contains a large amount of files, other tasks of a computer will be retarded. An obvious example is when an optical disc containing a large amount of image files is opened, the system needs to redraw a thumbnail each time a user opens a folder, for a file cannot be written into the optical disc, thereby wasting a lot of time and computer resources. Starting from Windows 2000, Windows may draw thumbnails for various types of files in advance, for example, JPEG, BMP, GIF, PNG, TIFF, AVI, PDF, PPTX, DOCX, HTML and the like, and store the thumbnails into a thumbnail cache file to solve the problem.

The touch screen 14 is configured to display a thumbnail of an application program in a thumbnail cache file that is stored in the storage apparatus 12. A user can swipe, press or touch the touch screen 14, so as to input a control command or data.

Figure 3A:
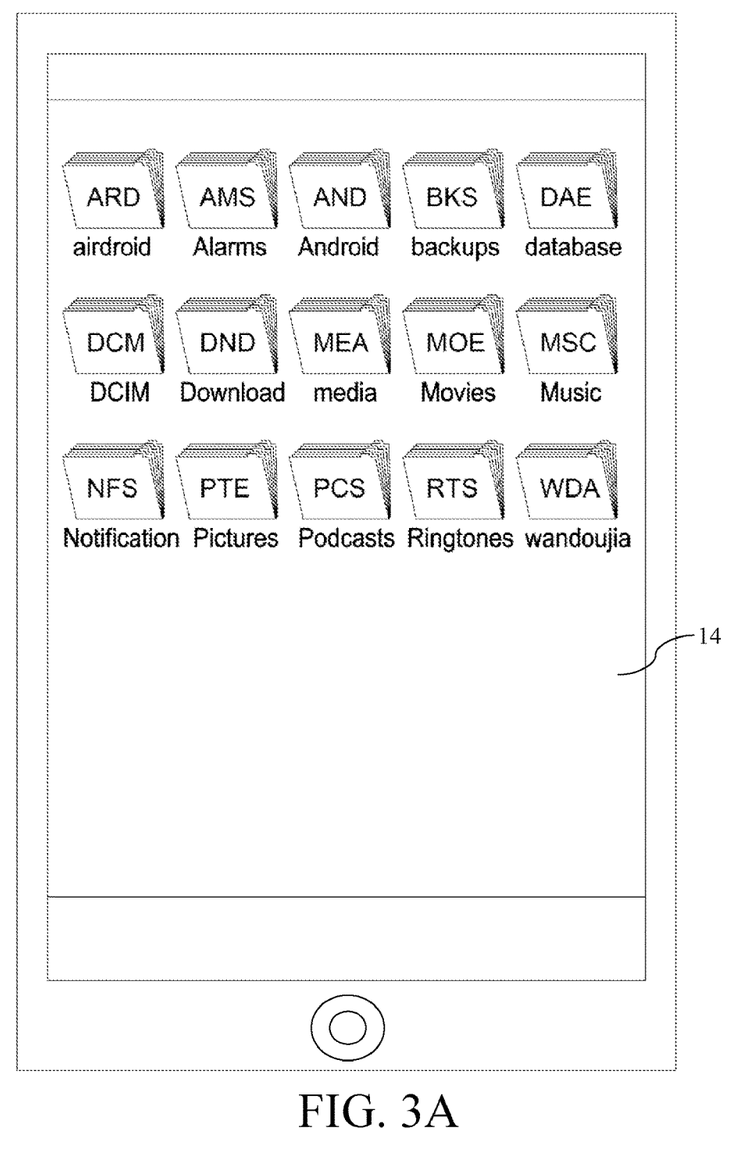
FIG. 3A and FIG. 3B are schematic diagrams of a thumbnail displayed by a hand-held electronic apparatus according to the present invention.
Figure 3B:
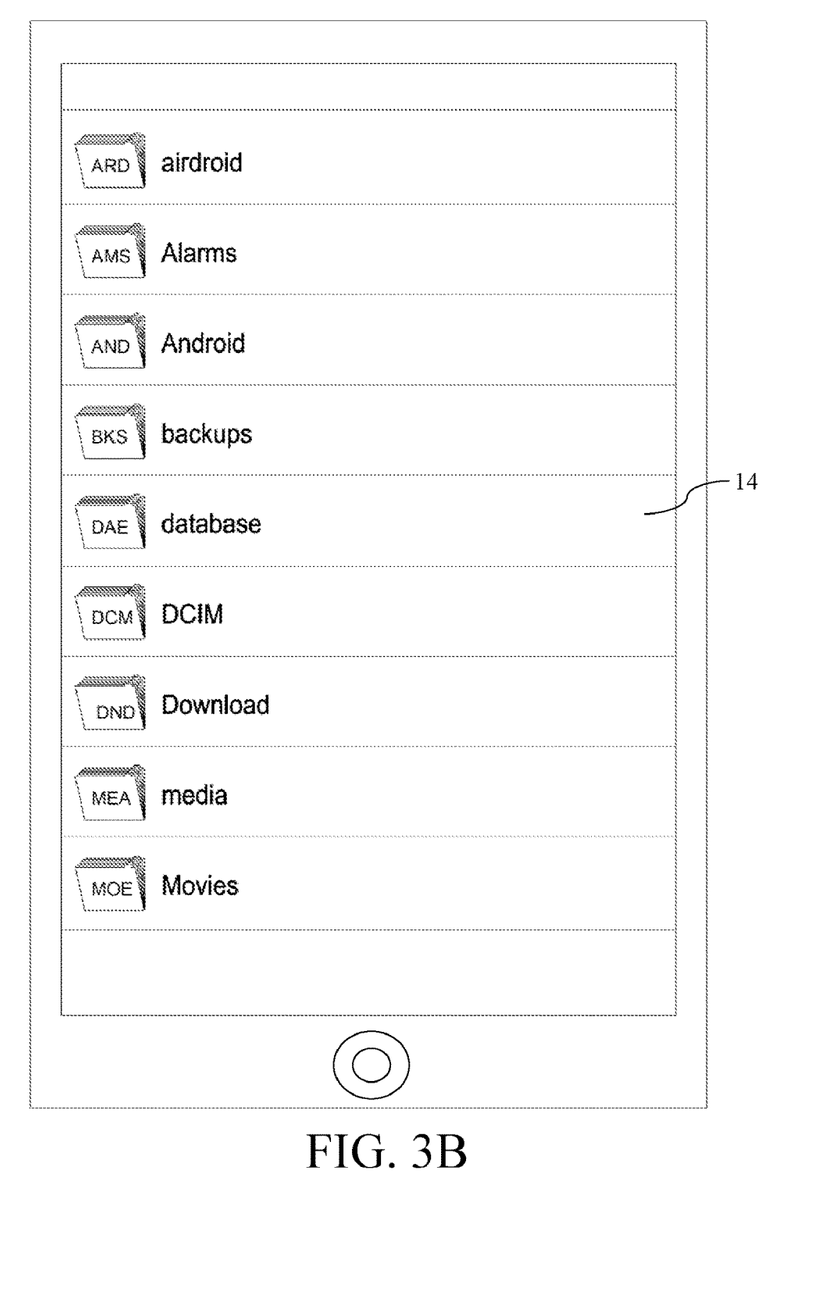

The processor 16 executes a thumbnail layout manner specified by an operating system stored in the storage apparatus 12, so as to display the thumbnail on the touch screen 14. FIG. 3A and FIG. 3B are schematic diagrams of a thumbnail displayed by a hand-held electronic apparatus according to the present invention. In FIG. 3A, a thumbnail is displayed on the touch screen 14 in a centralized manner, and in FIG. 3B, a thumbnail is displayed on the touch screen 14 in a list manner. In this embodiment, the thumbnail layout manners are not intended to limit the present invention, and any manner for displaying a thumbnail is applicable to the present invention.

The processor 16 transmits an online control request to the electronic apparatus 20, namely, a request for establishing a network link between the hand-held electronic apparatus 10 and the electronic apparatus 20. After receiving the online control request, the electronic apparatus 20 sends a response of the online control request to the processor 16, and then the processor 16 transmits a request for acquiring an application program to the electronic apparatus 20 according to the response of the online control request sent by the electronic apparatus 20. After receiving the request for acquiring the application program, the electronic apparatus 20 transmits a thumbnail cache file to the processor 16, and the processor 16 stores the received thumbnail cache file into the storage apparatus 12. The processor 16 transmits a control command that is input from the touch screen 14 to the electronic apparatus 20, and then the electronic apparatus 20 executes a related program according to the control command.

When a user clicks a thumbnail on the touch screen 14, the processor 16 will transmit an activation command generated by clicking the thumbnail on the touch screen 14 to the electronic apparatus 20, and the electronic apparatus 20 activates an application program that corresponds to the thumbnail according to the activation command.

Figure 4:
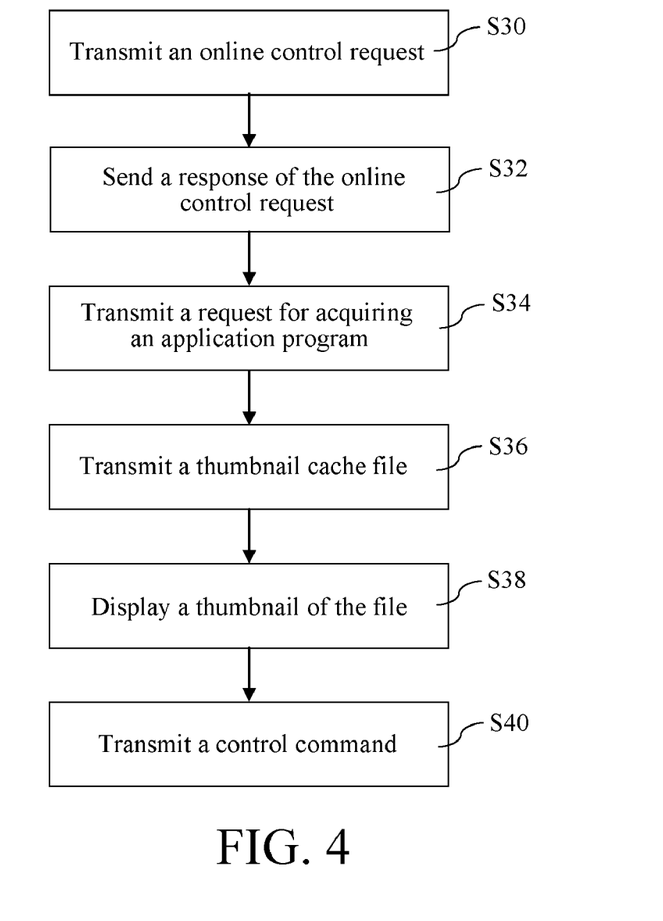
FIG. 4 is a flowchart of a method for activating an application program of an electronic apparatus according to the present invention.

FIG. 4 is a flowchart of a method for activating an application program of an electronic apparatus according to the present invention. Refer to components shown in FIG. 1, when the process flow of FIG. 4 is described.

In FIG. 4, first, an application program such as the aforementioned Unified Remote is downloaded into the hand-held electronic apparatus 10 and the electronic apparatus 20 at the same time, and when the application program Unified Remote is executed by the hand-held electronic apparatus 10 and the electronic apparatus 20 at the same time, the hand-held electronic apparatus 10 can be used to remotely control the electronic apparatus 20.

First, a network link is established between the hand-held electronic apparatus 10 and the electronic apparatus 20, and the processor 16 transmits an online control request to the electronic apparatus 20, so as to allow the hand-held electronic apparatus 10 to remotely control the electronic apparatus 20 (step S30). After receiving the online control request transmitted by the hand-held electronic apparatus 10, the electronic apparatus 20 sends a response of the online control request to the processor 16, indicating the electronic apparatus 20 permits online control by the hand-held electronic apparatus 10 (step S32).

The processor 16 transmits a request for acquiring an application program to the electronic apparatus 20 according to the response of the online control request sent by the electronic apparatus 20 (step S34). After receiving the request for acquiring the application program, the electronic apparatus 20 transmits to the processor 16 a thumbnail cache file of the thumbnail as shown in FIG. 2 (step S36).

The processor 16 stores the received thumbnail cache file into the storage apparatus 12, and displays a thumbnail in the thumbnail cache file on the touch screen 14. The thumbnail can be displayed on the touch screen 14 in a centralized manner as shown in FIG. 3A, or in a listing manner as shown in FIG. 3B, or another manner (step S38).

The processor 16 transmits a control command that is input from the touch screen 14 to the electronic apparatus 20, and then the electronic apparatus 20 executes a related program according to the control command (step S40). For example, when a user swipes the touch screen 14, the processor 16 transmits a swipe signal obtained by the touch screen 14 to the electronic apparatus 20, and a cursor on a screen (not marked in the figure) of the electronic apparatus 20 moves correspondingly according to the swipe signal; or when a user inputs data to the touch screen 14, the processor 16 transmits the input data obtained by the touch screen 14 to the electronic apparatus 20, and the input data is displayed on a screen of the electronic apparatus 20; or when a user clicks a thumbnail on the touch screen 14, the processor 16 transmits an activation command generated by clicking the thumbnail on the touch screen 14 to the electronic apparatus 20, and the electronic apparatus 20 activates an application program corresponding to the thumbnail according to the activation command.

The above method of the present invention can be implemented by a computer program product having a program stored therein. When the program is downloaded, for example, from the Internet and executed by the hand-held electronic apparatus, the steps of the method described above and shown in the figure can be performed.

The present invention provides a hand-held electronic apparatus having a function of activating an application program of an electronic apparatus, a method thereof, and a computer program product, where an application program installed in a smart television, desktop computer, or notebook computer is activated by using a hand-held electronic apparatus, so as to avoid difficulty in an operation of simulated mouse movement or keyboard input by using a hand-held electronic apparatus.

Although the present invention has been described as above with reference to the preferred embodiments and illustrative accompanying drawings, the above description should not be considered as a limitation to the present invention. Any modification, omission and change made by a person skilled in the art based on the form and embodiments of the present invention, shall not depart from the patent scope of the claims of the present invention.

What is claimed is:

1. A hand-held electronic apparatus having a function of activating an application program of a remote electronic apparatus, comprising:
a processor, configured to
transmit a remote control request to the remote electronic apparatus to establish a network link with to remotely control the remote electronic apparatus, receive a thumbnail cache file transmitted from the remote electronic apparatus upon establishing the network link, the thumbnail cache file containing a thumbnail that corresponds to an application program stored and executable in the remote electronic apparatus, and extract the thumbnail from the thumbnail cache file;

a storage apparatus, configured to store an operating system of the hand-held electronic apparatus and the thumbnail cache file received from the remote electronic apparatus; and a touch screen, configured to display the thumbnail, wherein upon extraction of the thumbnail from the thumbnail cache file, the processor causes the touch screen to display the thumbnail extracted by the processor of the hand-held electronic apparatus at a position determined according to a first thumbnail layout manner specified by the operating system of the hand-held electronic apparatus and upon receipt of a touch command on the thumbnail, transmits an activation command for the application program on the remote electronic apparatus that correspond to the thumbnail to the remote electronic apparatus such that the application program corresponding to the thumbnail is activated by the remote electronic apparatus, and wherein the first thumbnail layout manner specified by the operating system of the hand-held electronic apparatus is a centralized layout manner in which the thumbnails are displayed on the touch screen at a position defined by a predetermined number of columns and a predetermined number of rows or a list layout manner in which the thumbnail is displayed in a list form and is independent from a second thumbnail layout manner specified by the operating system of the remote electronic apparatus.

2. The hand-held electronic apparatus according to claim 1, wherein the remote electronic apparatus is a computer, a notebook computer, or a smart television.

3. The hand-held electronic apparatus according to claim 1, wherein the hand-held electronic apparatus is a smart phone or a tablet computer.

4. The hand-held electronic apparatus according to claim 1, wherein when the thumbnail on the touch screen is clicked on, the touch command is generated, and the remote electronic apparatus activates the application program that corresponds to the thumbnail according to the activation command.

5. A method for activating an application program of a remote electronic apparatus by using a hand-held electronic apparatus, the method comprising the following steps:

transmitting a remote control request from the hand-held electronic apparatus to the remote electronic apparatus to establish a network link between the hand-held electronic apparatus and to remotely control the remote electronic apparatus from the hand-held electronic apparatus;

upon establishing the network link, transmitting a thumbnail cache file transmitted from the remote electronic apparatus to the hand-held electronic device, the thumbnail cache file containing a thumbnail that corresponds to an application program stored and executable in the remote electronic apparatus;

storing the thumbnail cache file received from the remote electronic apparatus in a storage apparatus of the hand-held electronic apparatus;

by a processor of the hand-held electronic apparatus, extracting the thumbnail from the thumbnail cache file stored in the storage apparatus of the hand-held electronic apparatus;

upon extraction of the thumbnail from the thumbnail cache file, displaying the thumbnail extracted by the processor of the hand-held electronic apparatus on a touch screen of the hand-held electronic apparatus at a position determined according to a first thumbnail layout manner specified by an operating system of the hand-held electronic apparatus;

receiving a user input for the thumbnail displayed on the touch screen of the hand-held electronic apparatus;

transmitting an activation command for the application program on the remote electronic apparatus that correspond to the thumbnail from the hand-held electronic apparatus to the remote electronic apparatus based on the user input; and activating the application program on the remote electronic apparatus that corresponds to the thumbnail according to the received activation command, wherein the first thumbnail layout manner specified by the operating system of the hand-held electronic apparatus is a centralized layout manner in which the thumbnails are displayed on the touch screen at a position defined by a predetermined number of columns and a predetermined number of rows or a list layout manner in which the thumbnail is displayed in a list form and is independent from a second thumbnail layout manner specified by the operating system of the remote electronic apparatus.

6. The method according to claim 5, wherein before the receiving a thumbnail cache file by the hand-held electronic apparatus, the method further comprises the following steps:

transmitting, by the hand-held electronic apparatus, a request for acquiring an application program to the remote electronic apparatus; and receiving, by the hand-held electronic apparatus, the thumbnail cache file that is transmitted by the remote electronic apparatus.

7. The method according to claim 5, wherein the remote electronic apparatus is a computer, a notebook computer, or a smart television.

8. The method according to claim 5, wherein the hand-held electronic apparatus is a smart phone or a tablet computer.

9. A remote control system using a hand-held electronic apparatus having a function of activating an application program of a remote electronic apparatus, comprising:

the hand-held electronic apparatus including:

a processor, configured to establish a network link with the remote electronic apparatus and to process a thumbnail;

a storage apparatus, configured to store an operating system of the hand-held electronic apparatus and a thumbnail cache file received from the remote electronic apparatus, the thumbnail cache file including a thumbnail that corresponds to an application program stored and executable in the remote electronic apparatus; and a touch screen, configured to display the thumbnail; and the remote electronic apparatus that is remotely controlled by the hand-held electronic apparatus, wherein the hand-held electronic apparatus transmits a remote control request to the remote electronic apparatus to establish the network link between the hand-held electronic apparatus and the remote electronic apparatus and to remotely control the remote electronic apparatus from the hand-held electronic apparatus, upon establishing the network link, the remote electronic apparatus transmits the thumbnail cache file to the hand-held electronic apparatus, the hand-held electronic apparatus stores the thumbnail cache file received from the remote electronic apparatus in the storage apparatus of the hand-held electronic apparatus, the processor of the hand-held electronic apparatus extracts the thumbnail contained in the stored thumbnail cache file and displays the thumbnail on the touch screen at a position determined according to a first thumbnail layout manner specified by the operating system of the hand-held electronic apparatus, when the thumbnail on the touch screen is clicked on, the processor transmits an activation command for the application program on the remote electronic apparatus that correspond to the thumbnail from the hand-held electronic apparatus to the remote electronic apparatus based on the clicking of the thumbnail, the remote electronic apparatus activates the application program on the remote electronic apparatus that corresponds to the thumbnail according to the received activation command, and wherein the first thumbnail layout manner specified by the operating system of the hand-held electronic apparatus is a centralized layout manner in which the thumbnails are displayed on the touch screen at a position defined by a predetermined number of columns and a predetermined number of rows or a list layout manner in which the thumbnail is displayed in a list form and is independent from a second thumbnail layout manner specified by the operating system of the remote electronic apparatus.

10. The remote control system according to claim 9, wherein the remote electronic apparatus is a computer, a notebook computer, or a smart television.

11. The remote control system according to claim 9, wherein the hand-held electronic apparatus is a smart phone or a tablet computer.

* * * * *